US007271871B2

(12) United States Patent
Jen et al.

(10) Patent No.: US 7,271,871 B2
(45) Date of Patent: Sep. 18, 2007

(54) LIQUID CRYSTAL DISPLAY PANEL WITH REDUCED FLICKER

(75) Inventors: Tean-Sen Jen, Pingjhen (TW); Peter Liao, Gueishan Hsiang (TW); Ming-Tien Lin, Lujou (TW)

(73) Assignee: Hannstar Display Corporation, Taipei (TW)

( * ) Notice: Subject to any disclaimer, the term of this patent is extended or adjusted under 35 U.S.C. 154(b) by 8 days.

(21) Appl. No.: 10/848,243

(22) Filed: May 17, 2004

(65) Prior Publication Data
US 2005/0018121 A1 Jan. 27, 2005

(30) Foreign Application Priority Data
Jul. 23, 2003 (TW) .............................. 92120096 A

(51) Int. Cl.
G02F 1/1345 (2006.01)
(52) U.S. Cl. ...................... 349/152; 349/151; 349/149
(58) Field of Classification Search ......... 349/151–152
See application file for complete search history.

(56) References Cited
U.S. PATENT DOCUMENTS 6,406,946 B1 * 6/2002 Takizawa et al. ........... 438/149
6,483,495 B2 * 11/2002 Kaise et al. .................. 345/93
6,774,414 B2 * 8/2004 Chang ........................ 257/208
6,801,288 B1 * 10/2004 Ashizawa et al. .......... 349/149
6,842,200 B1 * 1/2005 Su et al. ....................... 349/38
2002/0060833 A1 * 5/2002 Yamaguchi ................. 359/245
2003/0086048 A1 * 5/2003 Ukita ......................... 349/149

* cited by examiner

Primary Examiner—Andrew Schechter
Assistant Examiner—W. Patty Chen
(74) Attorney, Agent, or Firm—Egbert Law Offices

(57) ABSTRACT

A liquid crystal display panel with reduced flicker comprises an active matrix substrate equipped with a plurality of thin film transistors. The active matrix substrate has an active area that is formed with a plurality of first signal lines and a plurality of second signal lines crossing each other. The active area includes a plurality of pixels arranged in a matrix. There are outer-lead bonding areas around the active area. There are a plurality of pad areas within the outer-lead bonding areas. A plurality of second wires arranged in a fan-out configuration extend from the pad areas and stretch toward the active area. The second wires are connected to their respective first signal lines by their serpentine or zigzag routes resulting in various wire lengths. A frame-like lead overlaps the second wires, and a capacitor exists between each of the second wires and the closed frame-like lead. The induced capacitor and the resistance of the corresponding second wire together result in a compensation effect so as to uniform the time constants of the plurality of first signal lines.

17 Claims, 10 Drawing Sheets

LIQUID CRYSTAL DISPLAY PANEL WITH REDUCED FLICKER

BACKGROUND OF THE INVENTION

1. Field of the Invention

The present invention relates to a liquid crystal display (LCD) panel with reduced flicker and more particularly to a compensation circuit for enabling scanning lines or data lines of the liquid crystal display panel to have the same time constants.

2. Description of the Related Art

A conventional liquid crystal display panel comprises an active matrix substrate 10, as shown in FIG. 1. The active matrix substrate 10 has a plurality of data lines 13 and a plurality of scanning lines 12; the data lines 13 and the scanning lines 12 cross each other to form a plurality of pixels arranged in a matrix. In addition, a plurality of thin film transistors (TFTs) are formed within an active area B, which is the area where the data lines 13 and the scanning lines 12 cross perpendicularly.

There are a plurality of outer-lead bonding (OLB) areas 14 surrounding the active area B. A plurality of pads are formed within the outer-lead bonding areas 14, so that driving devices can be connected to the outer-lead bonding areas 14. And a fan-out area 16 arranged a plurality of wires 15 is disposed next to the inner side of each outer-lead bonding area 14.

FIG. 2 is a magnified schematic view of the portion C in FIG. 1. Each wire 15 extends from the outer-lead bonding area 14 so as to be connected, along a straight line, to a scanning line 13 of the active area B.

Since the length of the outermost wire 151 is far different from that of the central wire 152, it is understood that a maximum resistance and a minimum resistance are found in the outermost wire 151 and the central wire 152, respectively. That may be the resistance of the wire 15 calculated as follows:

$$R = \rho \frac{L}{S},$$

where $\rho$, L and S respectively represent resistance, length, and cross sectional area of the wire 15.

The product of resistance R and capacitance C is directly related to the delay time of a signal transmitted by either one of the data lines 13 or one of the scanning lines 12. So, the wires 15 have different RC time constants between them whenever driving signals are sent from the driving devices connected to the outer-lead bonding areas 14; as a result, the driving signals are subjected to varying degrees of delay effect when carried by the wires 15.

A primary cause of the flickers that occur in liquid crystal display panels is the above-mentioned delay effect. On one hand, delay time constants vary from one scanning line 12 to another scanning line 12 and thus flicker points are visible if watched specially along the vertical direction; on the other hand, relatively great delay effect is accumulated at the end of the same scanning line 12 opposite to the respective driving device, thus scanning signals are distorted when they reach the distal end of the scanning line 12 and, in consequence, the corresponding pixels fails to display a current gray level changed from a previous gray level within the right period as scheduled, resulting in flicker points visible to an individual watching along the horizontal direction.

In short, there is great demand for a liquid crystal display panel free from flickers and therefore conducive to quality display.

SUMMARY OF THE INVENTION

The first objective of the present invention is to provide a liquid crystal display panel with reduced flicker wherein delay states between scanning lines are almost made uniform effect through a compensation circuit, eliminating the flickers that may otherwise occur because of the discrepancies in the time constants of the scanning lines.

The second objective of the present invention is to provide a liquid crystal display panel without lateral light leaks, wherein a frame-like lead of the compensation circuit hides the light leaks that may otherwise be visible if watched in an oblique direction around 45° to the rim of an upper fixed frame. Therefore, the image quality of the liquid crystal display panel is quite improved.

In order to achieve the aforesaid objectives, the present invention discloses a liquid crystal display panel with reduced flicker, which comprises an active matrix substrate equipped with a plurality of thin film transistors. The active matrix substrate has an active area that is formed with a plurality of first signal lines and a plurality of second signal lines crossing each other. The active area includes a plurality of pixels arranged in a matrix. There are outer-lead bonding areas around the active area. There are a plurality of pad areas within the outer-lead bonding areas. A plurality of second wires arranged in a fan-out configuration extend from the pad areas and stretch toward the active area. The second wires are connected to their respective first signal lines by their serpentine or zigzag routes resulting in various wire lengths. A frame-like lead, as a closed loop, overlaps the second wires, and a capacitor exists between each of the second wires and the closed frame-like lead. The induced capacitor and the resistance of the corresponding second wire together result in a compensation effect so as to unify the time constants of the plurality of first signal lines.

BRIEF DESCRIPTION OF THE DRAWINGS

The invention will be described according to the appended drawings in which.

PREFERRED EMBODIMENT OF THE PRESENT INVENTION

Figure 1:
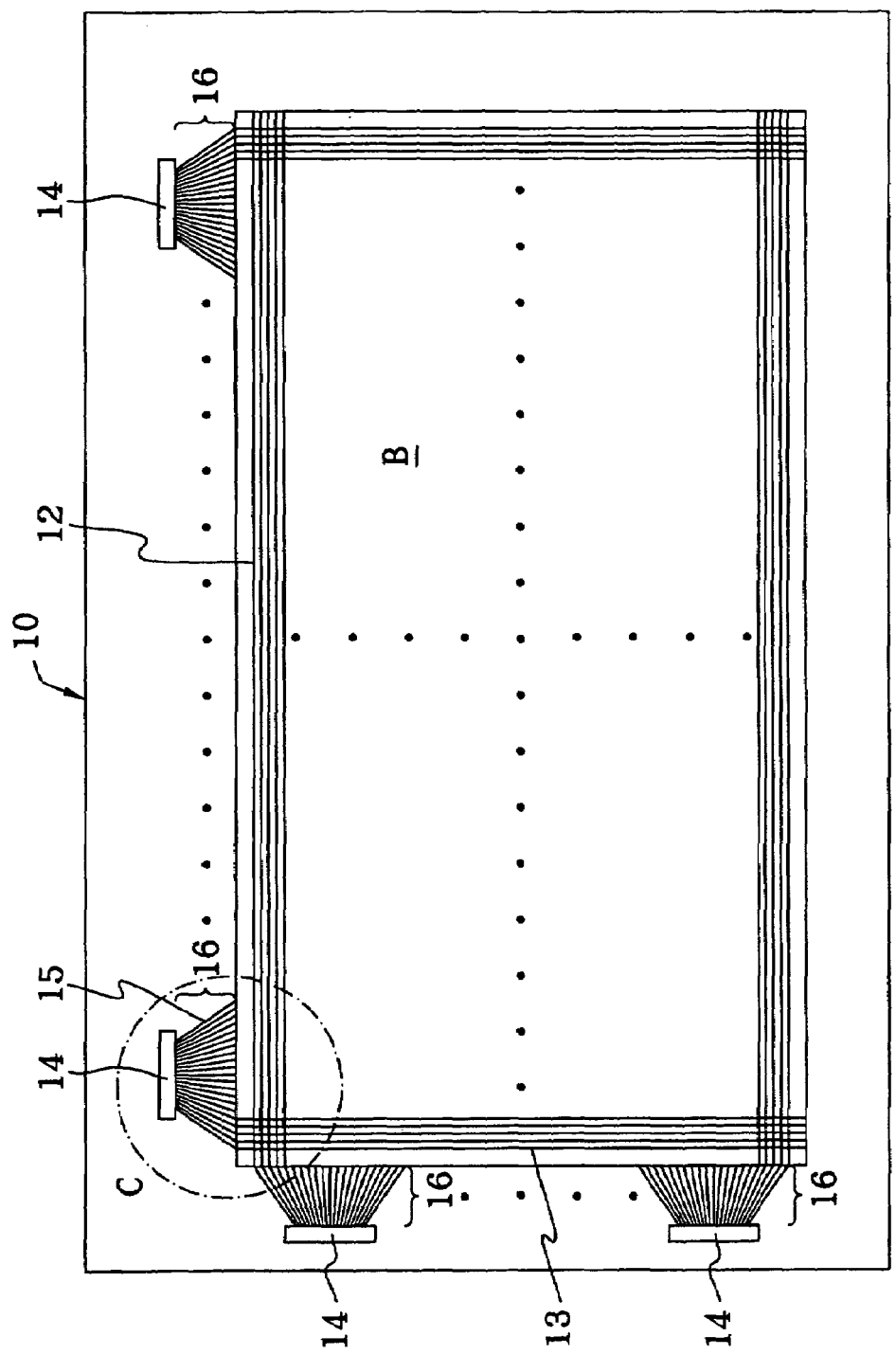
FIG. 1 is a circuit layout diagram of an active matrix substrate in accordance with a conventional liquid crystal display panel.
Figure 2:
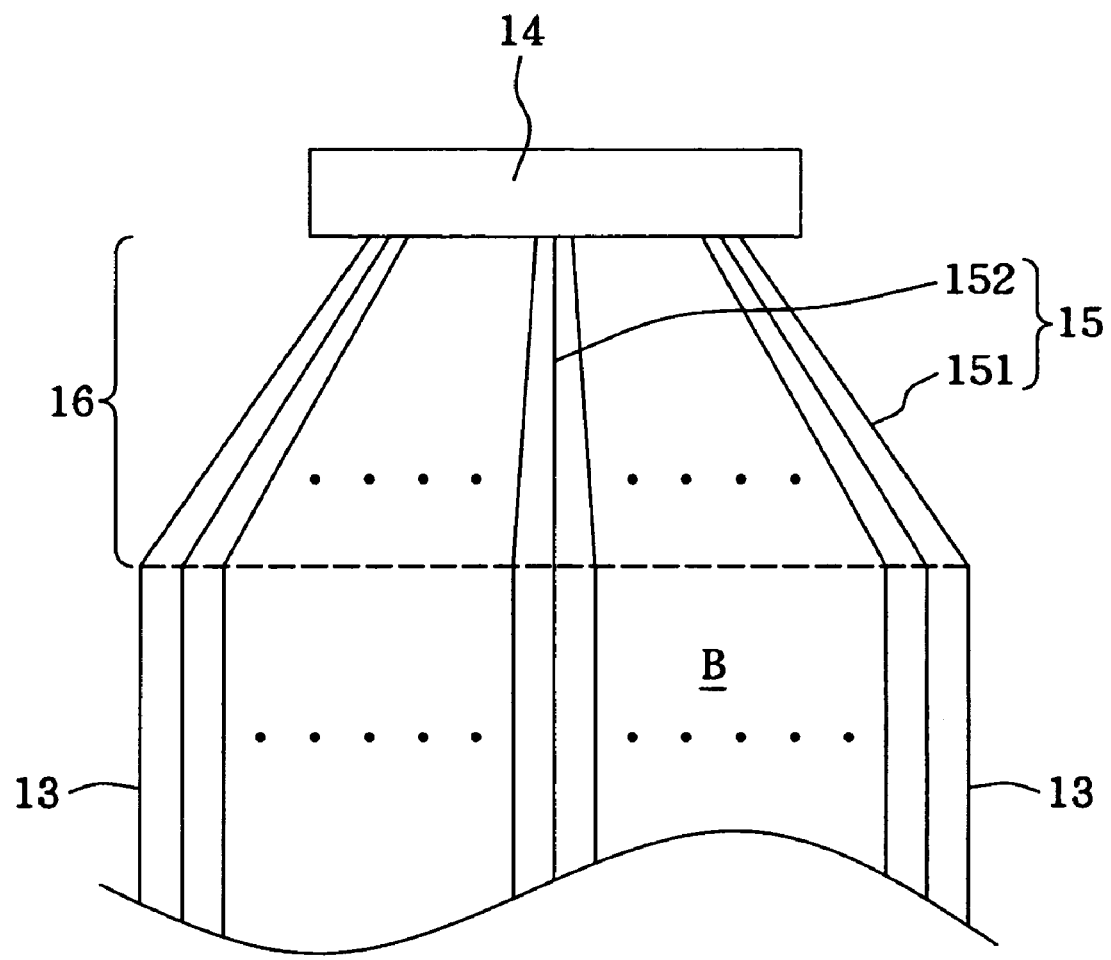
FIG. 2 is an enlarged schematic view of the portion C in FIG. 1.
Figure 3A:
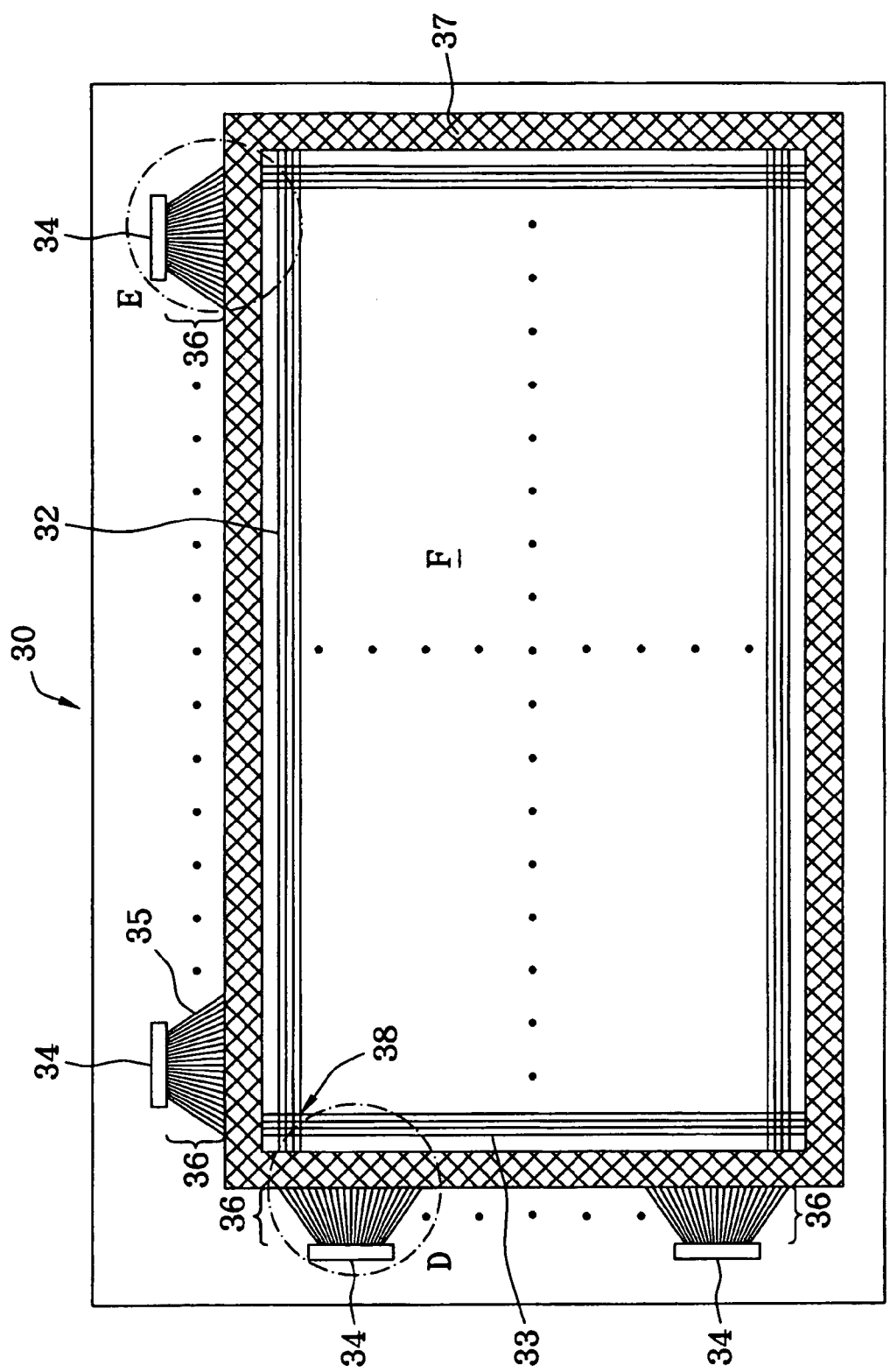
FIG. 3(a) is a circuit layout diagram of an active matrix substrate in accordance with the liquid crystal display panel of the present invention.

FIG. 3(a) is a circuit layout diagram of an active matrix substrate in accordance with the liquid crystal display panel of the present invention. The active matrix substrate 30 has a plurality of data lines 33 and a plurality of scanning lines 32. The data lines 33 (or named first signal lines) and the scanning lines 32 (or named second signal lines) cross each other to form a plurality of pixels 38 arranged in a matrix, and are all included in signal lines that are responsible to transmit various control signals. In addition, a plurality of thin film transistors (not shown in the figure) are formed within each pixel 38. The total area occupied by the pixels 38 constitutes the active area F.

Figure 3B:
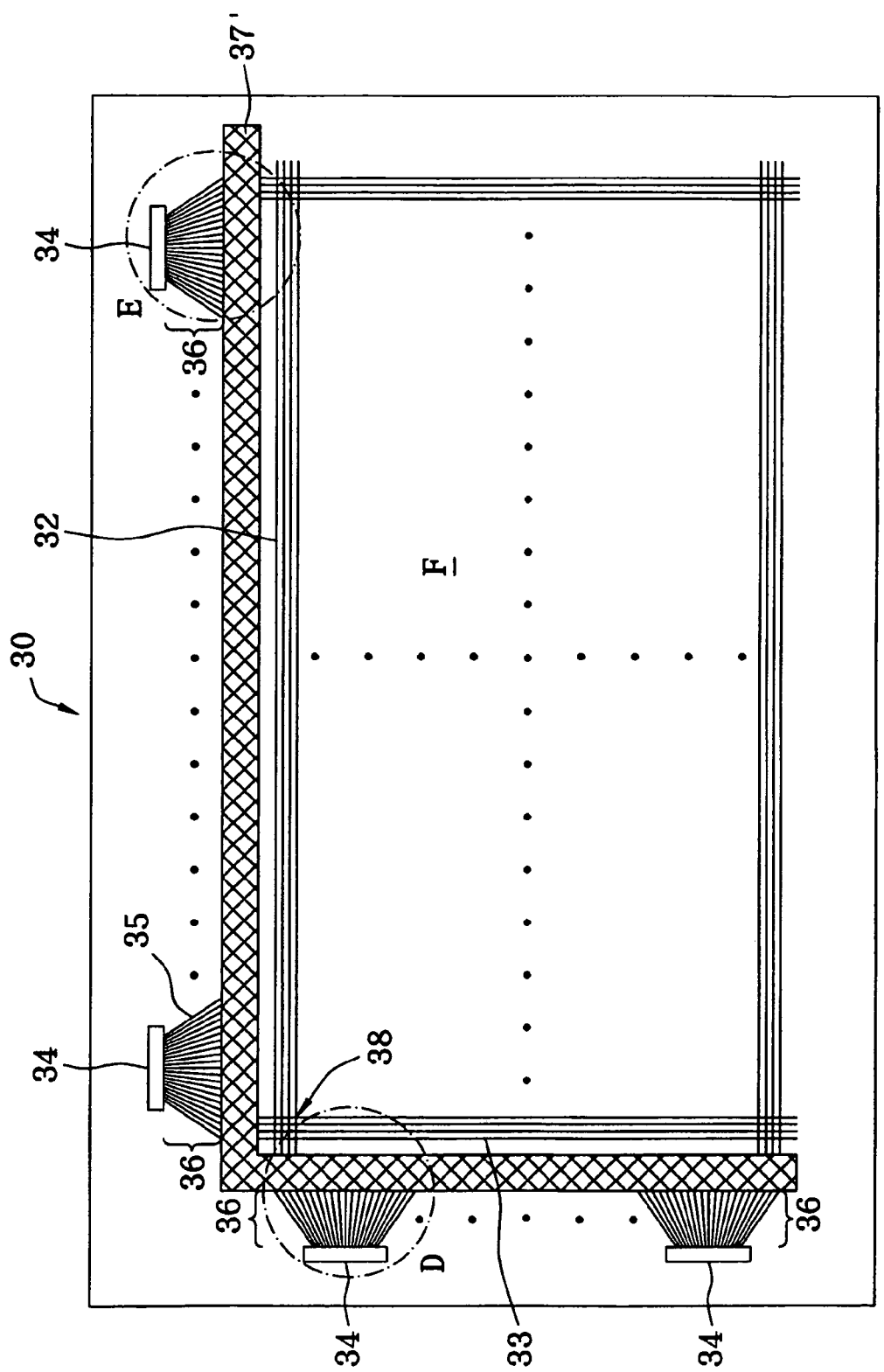
FIG. 3(b) is another circuit layout diagram of an active matrix substrate in accordance with the liquid crystal display panel of the present invention.
Figure 4:
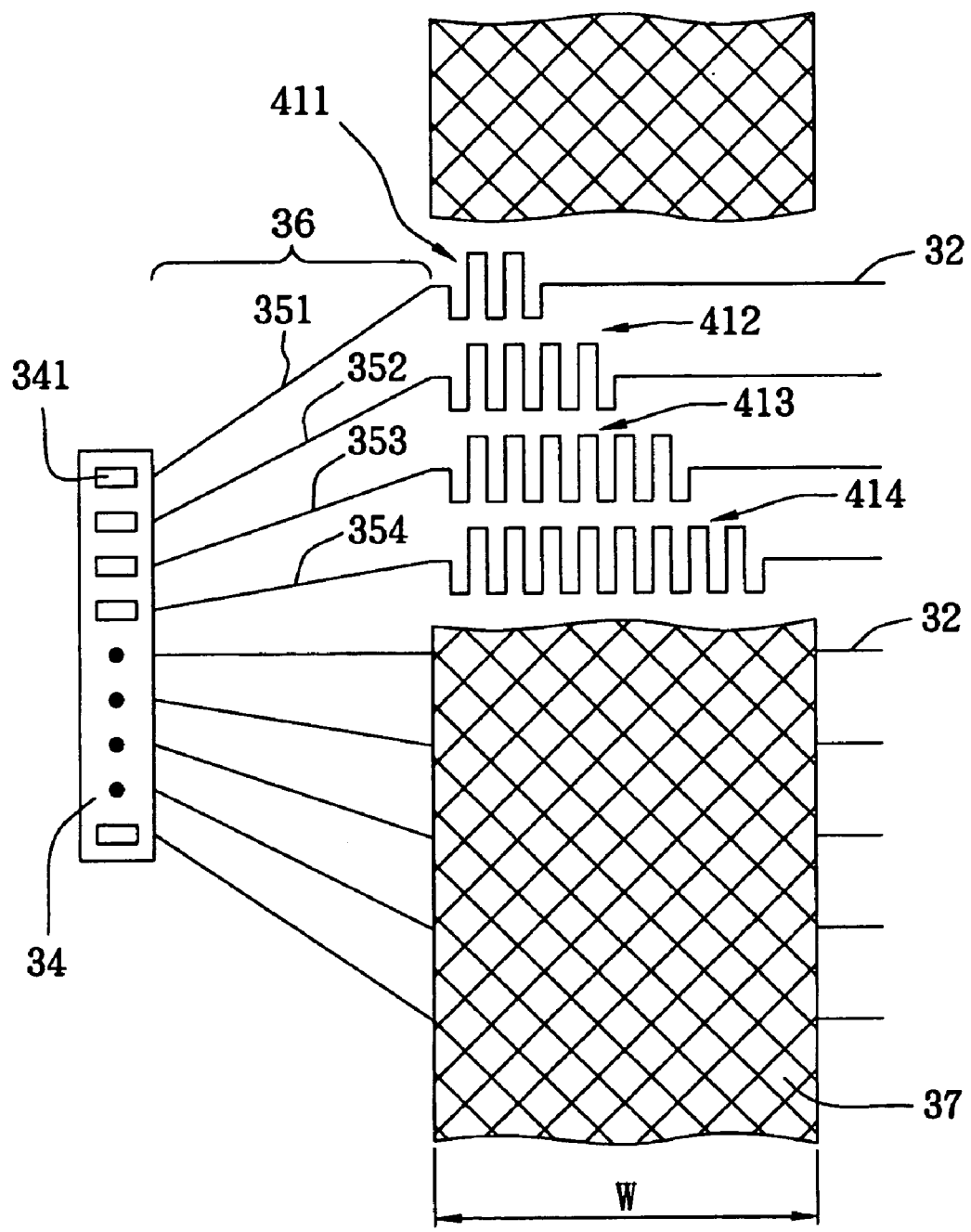
FIG. 4 is an enlarged schematic view of the portion D in FIG. 3(a)

There are a plurality of outer-lead bonding areas 34 around the active area F. A plurality of pads 341 (as shown in FIG. 4) are formed within the outer lead bonding areas 34, so that driving devices can be connected to the outer lead bonding areas 34 by these pads 341. A fan-out area 36 is disposed next to the inner side of each outer lead bonding area 34; a plurality of first wires 35 are arranged in a fan-out configuration inside the fan-out area 36. In addition, a closed annular or frame-like lead 37 is arranged around the active area F; the frame-like lead 37 is connected to a common electrode. As shown in FIG. 3(b), it is feasible to replace the frame-like lead 37 in FIG. 3(a) with an L-shaped lead 37' considering the circuit layout of the active matrix substrate. The L-shaped lead 37' is not closed, because it is merely arranged along the boundary between the active area F and the fan-out area 36.

FIG. 4 is an enlarged schematic view of the portion D in FIG. 3(a). A plurality of serpentine or zigzag second wires 411, 412, 413 and 414, beneath the frame-like lead 37, are connected to first wires 351, 352, 353 and 354 respectively, and other end of each of them is connected to a scanning line 32. Of these second wires, the second wire 411 is obviously the shortest, whereas the second wires 412, 413 and 414 are progressively longer in numerical order. To equalize the RC time constant of the scanning lines 32, it is necessary to keep the length of every zigzag wire under control in order to achieve a balance between the discrepancies in the length of the straight first wires 35 disposed inside the fan-out area 36. If the active area F is 337.92 mm wide (measured in the direction of the scanning lines 32), it is recommended that the width W of the frame-like lead 37 should be 2.5 mm.

One point worthy of notice is that the frame-like lead 37 and the scanning lines 32 do not lie in the same layer. The frame-like lead 37 can be either an opaque metallic layer or a transparent electrode layer, thus a capacitor is formed between the circular lead 37 and each zigzag wire.

Figure 5:
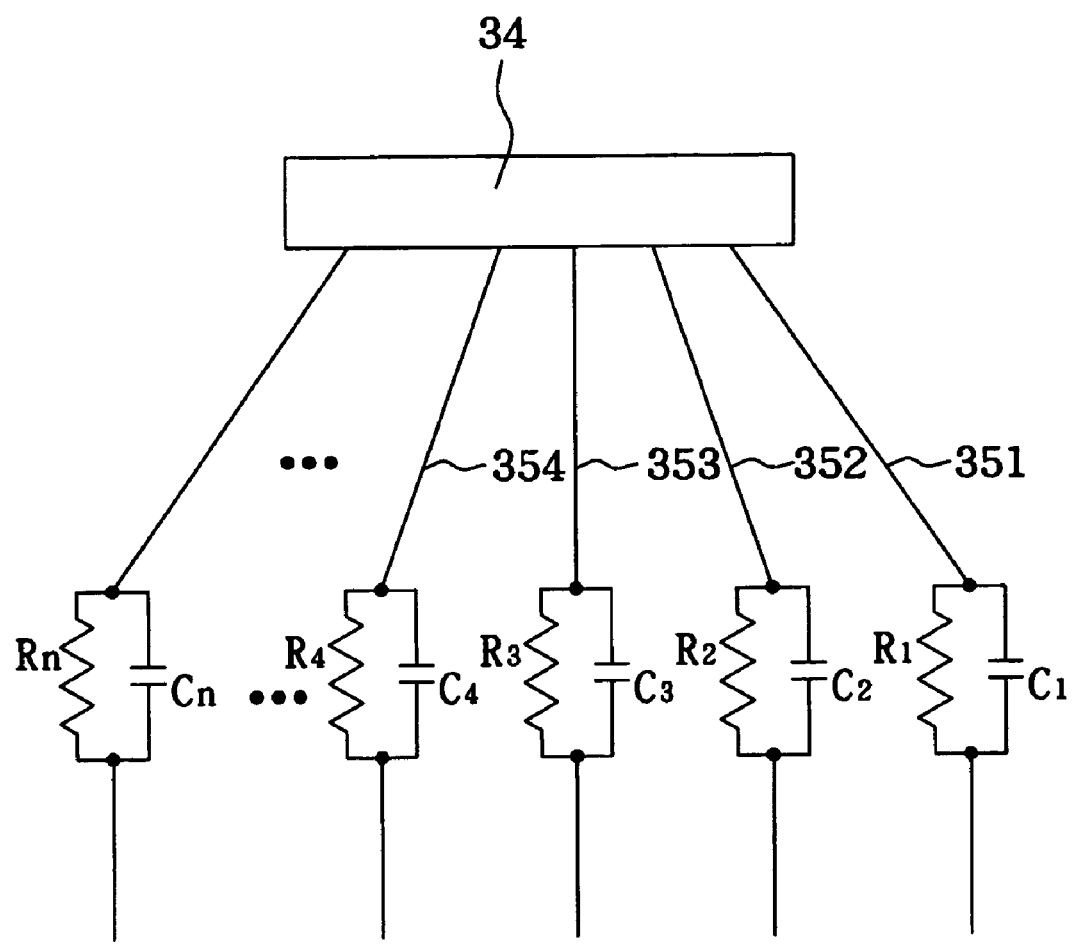
FIG. 5 is an equivalent circuit diagram of the compensation circuit in accordance with the present invention.

FIG. 5 is an equivalent circuit diagram of the compensation circuit in accordance with the present invention. A total resistor $R_1$ of the zigzag wire 411 is connected to the first wire 351 in series, whereas an equivalent capacitor $C_1$ formed between the frame-like lead 37 and the second wire 411 is connected to the resistor $R_1$ in parallel. It is derived that $R_2 > R_1$ because the second wire 412 is longer than the second wire 411. By the same token, the relations between $R_2 - R_n$ also can be obtained.

Figure 6:
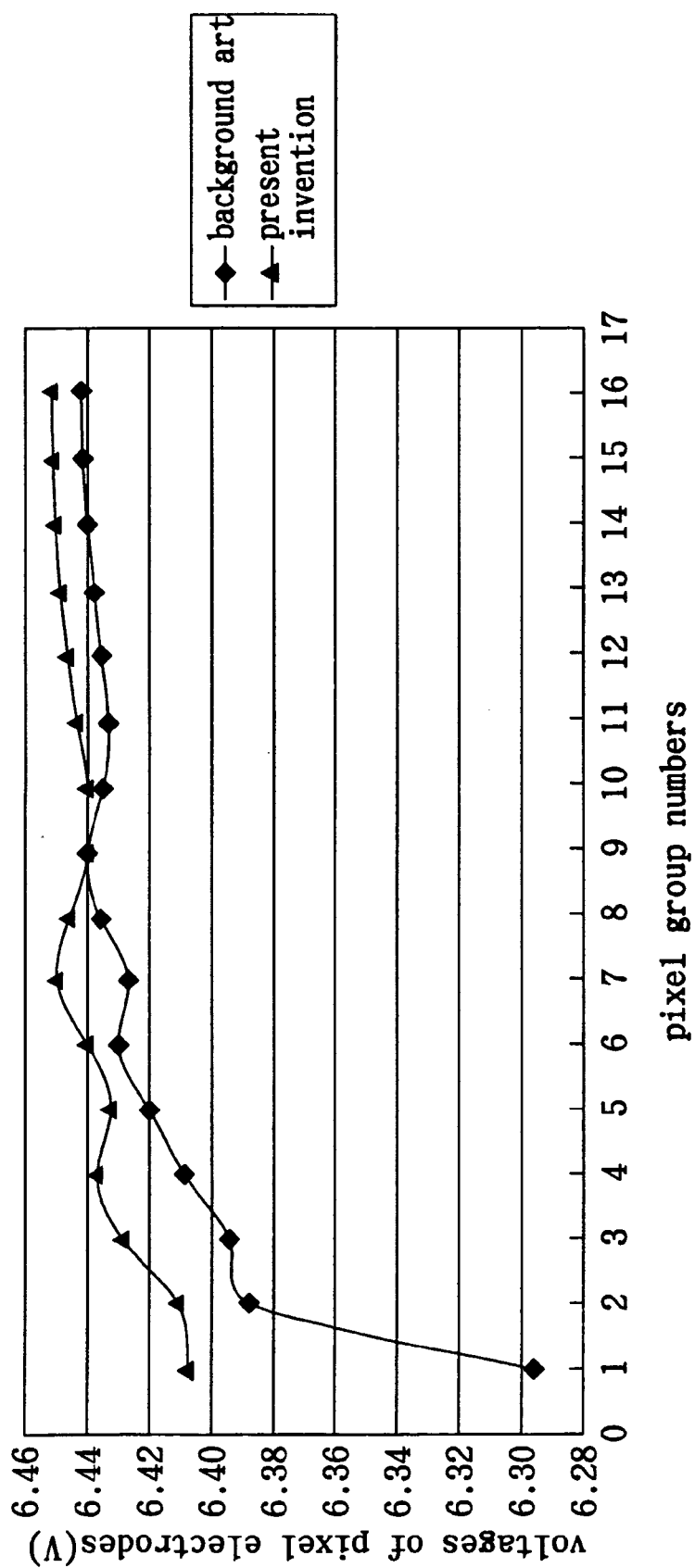
FIG. 6 is a voltage distribution curve of pixel electrodes of pixels along a scanning line in accordance with the present invention.

The compensation circuit in accordance with the present invention enables a scanning line to remain consistent in the RC time constant throughout the length of the scanning line, so that the voltage of the pixel electrode of every pixel on the scanning line remains consistent after the same data were written. As shown in FIG. 6, the x-axis describes pixel group numbers; where, from right to left, all the pixels on the scanning line are sequentially divided into 16 groups. As regards the pixels of a single conventional scanning line that lacks an RC compensation circuit, the voltages of the pixel electrodes of the pixels near the fan-out area 36 are relatively low and therefore different from the voltages of the pixel electrodes of the pixels far from the fan-out area 36. However, in a single scanning line put forth in accordance with the present invention the voltages of the pixel electrodes of the pixels near the fan-out area 36 approximate to the voltages of the pixel electrodes of the pixels far from the fan-out area 36, equalizing the displayed gray levels and, in consequence, eliminating flickers.

Figure 7:
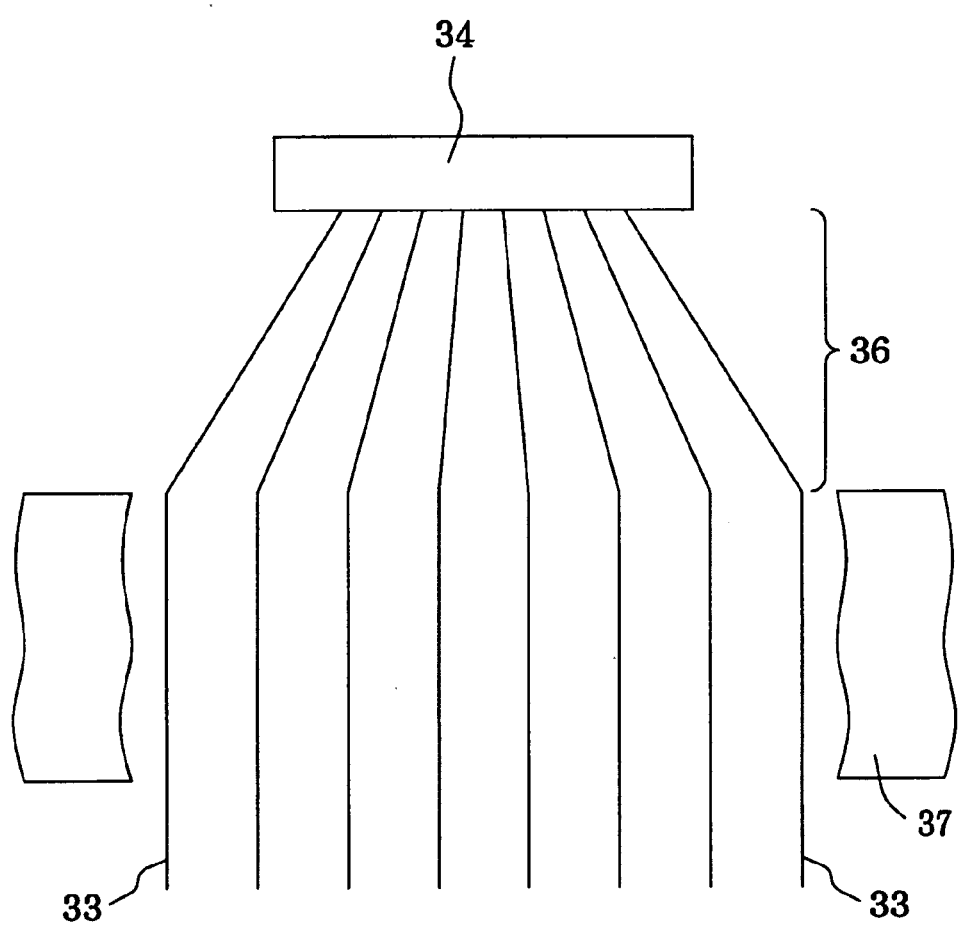
FIG. 7 is an enlarged schematic view of the portion E in FIG. 3(a)

FIG. 7 is an enlarged schematic view of the portion E in FIG. 3(a). Portion E includes the end of each data line 33 for receiving data signals from data drivers, whereas beneath the frame-like lead 37 there is the connection between the first wires 36 and the data lines 33, as opposed to the second wires shown in FIG. 4. Capacitance effect still takes place in between the frame-like lead 37 and the data line 33; however, it is too insignificant to be considered.

Figure 8:
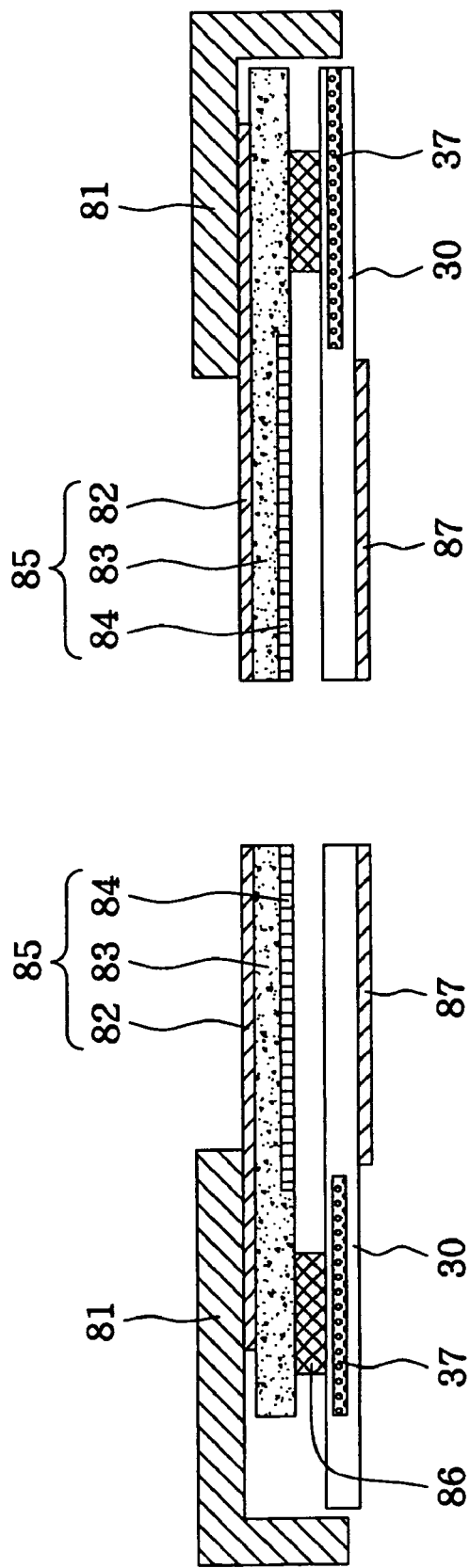
FIG. 8 is a schematic diagram of the structure of the assembled liquid crystal display panel in accordance with the present invention.

FIG. 8 is a schematic diagram of the structure of the assembled liquid crystal display panel in accordance with the present invention. Lying on both sides of the top surface are the rims of the upper fixed frame 81 that presses against a color filter 85. The color filter 85 has a glass substrate 83 with a polarizing film 82 thereon. An opaque black matrix 84 is disposed on the other surface of the color filter 85 opposite to the polarizing film 82.

As regards a conventional liquid crystal display panel, light rays passing the outer edge of the black matrix 84 are visible to a user watching in a oblique direction 45° to the inner edge of the upper fixed frame 81, deteriorating image display quality. Light leaks as such are particularly serious in those liquid crystal display panels whose liquid crystal filling process is carried out by means of the one drop filling (ODF) technique. Although the light leak problem can be solved by extending the black matrix 84 outward, this inevitably increases the overall area of a liquid crystal display panel and thus it does not conform to the panel specifications stipulated by the standard panels working group (SPWG). Liquid crystal display panels, especially those intended for notebook, have to conform to the specifications formulated by the SPWG.

The active matrix substrate 30 and the color filter 85 put forth in accordance with the present invention are glued together with sealant 86, and the frame-like lead 37 disposed on the active matrix substrate 30 is beneath the sealant 86; hence, light rays passing the external edge of the black matrix 84 are invisible to a user watching in a oblique direction 45° to the inner edge of the upper fixed frame 81. Beneath the active matrix substrate 30 is another polarizing film 87 that receives light rays from a backlight module.

Figure 9:
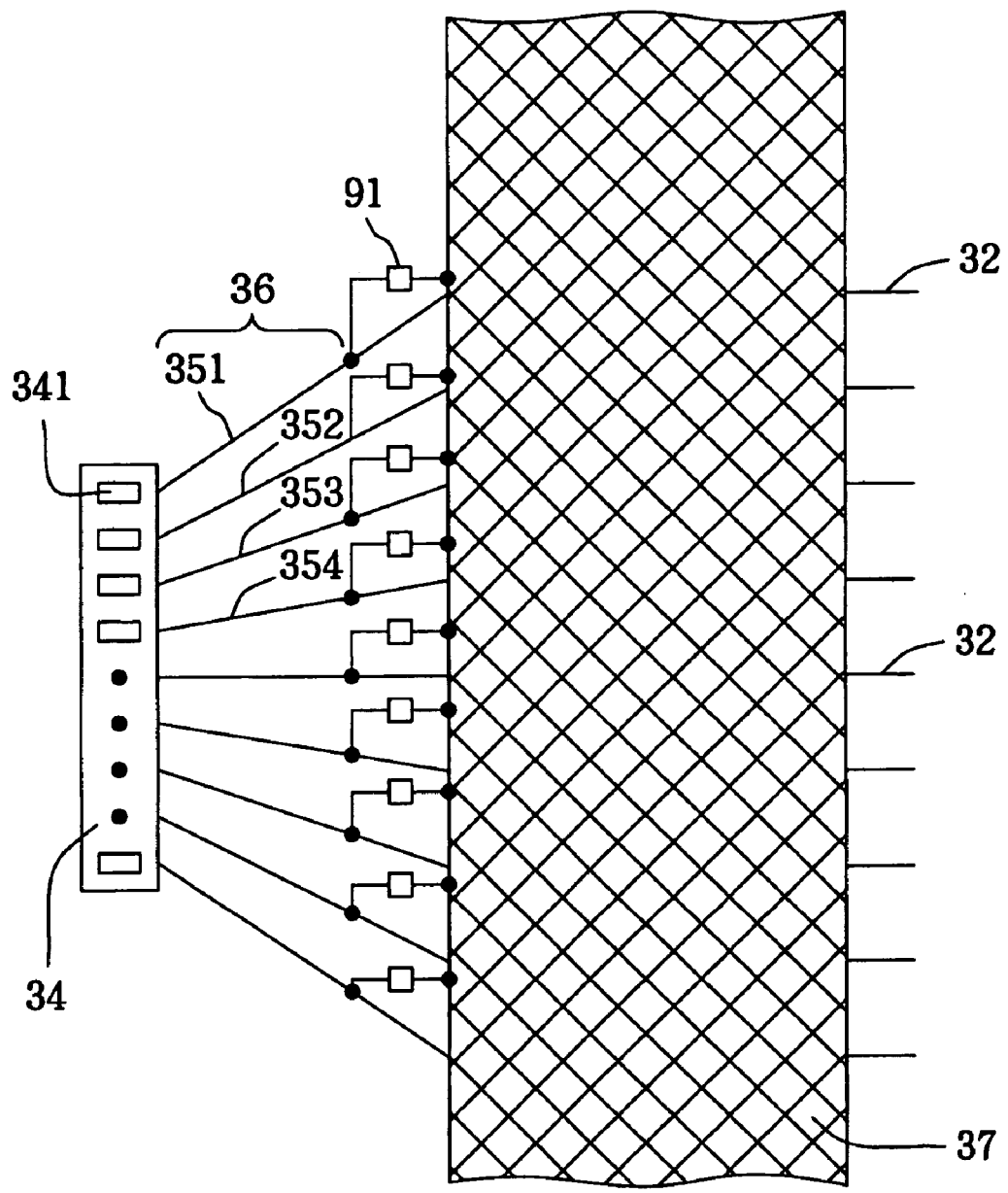
FIG. 9 is a schematic diagram of an electrostatic protection circuit combined with a frame-like lead in accordance with the present invention.

The present invention involves using the frame-like lead 37 as the discharging end of electrostatic charges for an electrostatic protection circuit 91, as shown in FIG. 9. One end of the electrostatic protection circuit 91 is connected to the wire 351, whereas its other end is connected to the frame-like lead 37.

The above-described embodiments of the present invention are intended to be illustrative only. Numerous alternative embodiments may be devised by persons skilled in the art without departing from the scope of the following claims.

What is claimed is:

1. A liquid crystal display panel with reduced flicker comprising:
    a plurality of first signal lines;
    a plurality of second signal lines crossing the first signal lines to form a plurality of pixels at intersections of the first signal lines and the second signal lines;
    a plurality of outer-lead bonding areas placed at periphery of the pixels;
    a plurality of first wires having first ends connected to the outer-lead bonding areas, wherein the first wires are arranged in a fan-out configuration;
    a plurality of second wires having first ends connected to second ends of the first wires and second ends of the second wires are connected to the first signal lines or the second signal lines, wherein the second wire has a meandering portion; and
    a frame-like lead placed at a periphery of the pixels and overlapping the second wires, wherein the width of the frame-like lead is uniform.

2. The liquid crystal display panel with reduced flicker of claim 1, wherein the frame-like lead is connected to a common electrode.

3. The liquid crystal display panel with reduced flicker of claim 1, wherein the frame-like lead and the second wires are separately placed in different layers.

4. The liquid crystal display panel with reduced flicker of claim 1, wherein each of the outer-lead bonding areas has a plurality of pads.

5. The liquid crystal display panel with reduced flicker of claim 4, wherein the pads and the first wires are connected to each other.

6. The liquid crystal display panel with reduced flicker of claim 1, wherein the second wire has a zigzag-shaped route.

7. The liquid crystal display panel with reduced flicker of claim 1, wherein the second wire has a serpentine or wave-shaped route.

8. The liquid crystal display panel with reduced flicker of claim 1, wherein the second wires are arranged in parallel.

9. The liquid crystal display panel with reduced flicker of claim 1, wherein the length of the second wire is in an inverse proportion to the length of the first wire connected to the second wire.

10. The liquid crystal display panel with reduced flicker of claim 1, wherein the length of the second wire is adjusted to have an increase in length according to the decrease in length of the first wire.

11. The liquid crystal display panel with reduced flicker of claim 1, wherein the first signal lines are scanning lines and the second signals are data lines.

12. A liquid crystal display panel with reduced flicker, comprising a plurality of first signal lines, a plurality of second signal lines, a plurality of pixels including a plurality of pixel electrodes, a lead and a plurality of outer-lead bonding areas, said lead being an L-shaped lead or a frame-shaped lead, a plurality of first wires arranged in fan-out configuration, a plurality of second wires each having meandering portion, wherein the first wires are connected between the outer-lead bonding areas and the second wires, the plurality of second wires each being disposed between the first wires and the first signal lines or the second signal lines, wherein the lead with uniform width overlaps the second wires to unify a delay time of the first signal line or the second signal line among the different first signal lines or the different second signal lines and to remain consistent in a voltage of the pixel electrode in the pixels along each of the first signal lines or each of the second signal lines.

13. The liquid crystal display panel with reduced flicker of claim 12, wherein the lead and the second wires are separately placed in different layers.

14. The liquid crystal display panel with reduced flicker of claim 12, wherein the second wire has a zigzag-shaped route.

15. The liquid crystal display panel with reduced flicker of claim 12, wherein the second wire has a serpentine or wave-shaped route.

16. The liquid crystal display panel with reduced flicker of claim 12, further comprising an active matrix substrate on which pixels are disposed, a color filter glued together with a sealant, wherein the lead is disposed beneath the sealant.

17. The liquid crystal display panel with reduced flicker of claim 12, wherein the second wires are arranged in parallel.

* * * * *